No. 628,687. Patented July 11, 1899.
A. J. BRADLEY.
MACHINE FOR MAKING PUNCHES.
(Application filed June 15, 1896.)
(No Model.) 2 Sheets—Sheet 2.
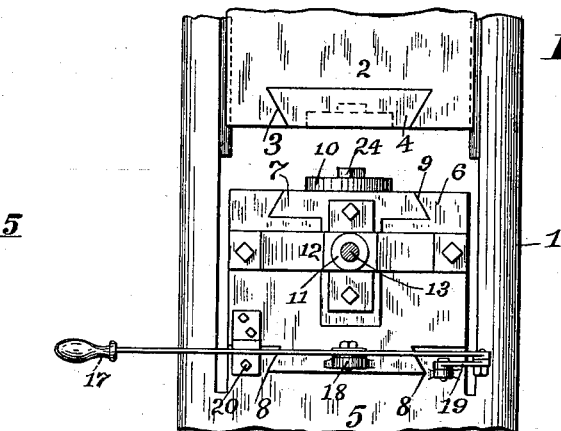
Fig. 3.
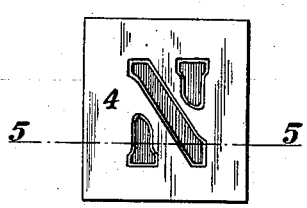
Fig. 4.
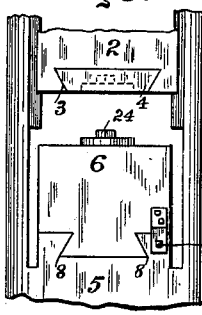
Fig. 3ª.
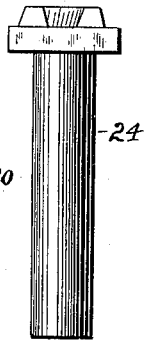
Fig. 8.
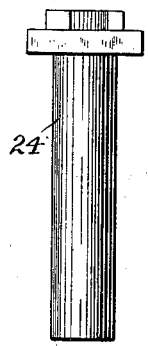
Fig. 9.
Fig. 5.
Fig. 6.
Fig. 7.
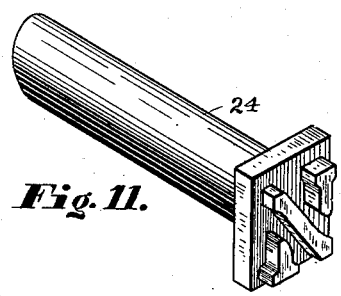
Fig. 11.
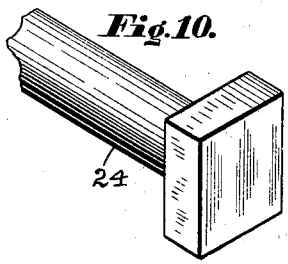
Fig. 10.
Attest:—
Edw. L. Dillon
Chas. E. Price
Inventor:—
A. J. Bradley,
Carr & Carr, Att'ys
THE NORRIS PETERS CO., PHOTO-LITHO., WASHINGTON, D. C.

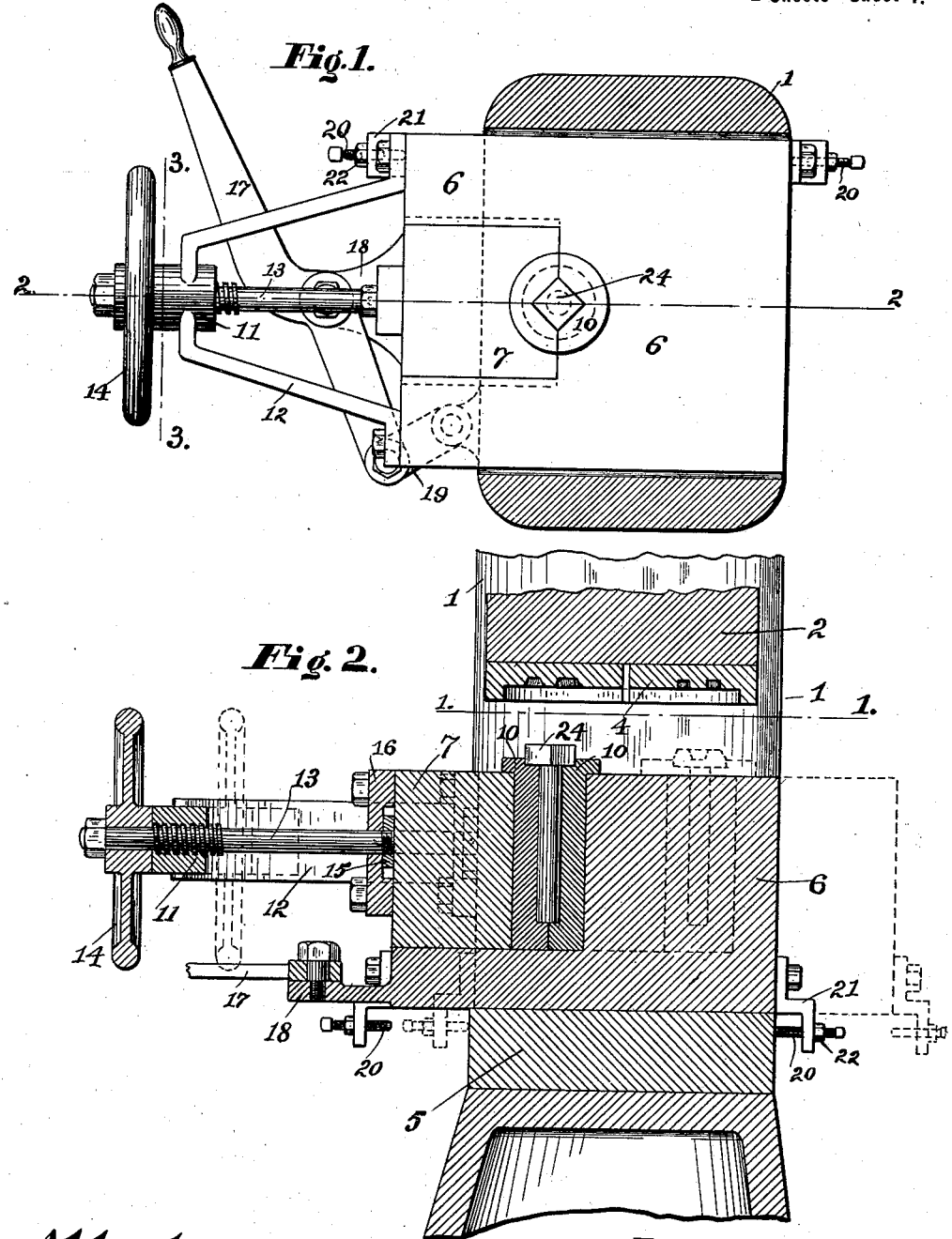

UNITED STATES PATENT OFFICE.

ANDREW J. BRADLEY, OF ST. LOUIS, MISSOURI, ASSIGNOR TO THE BRADLEY STENCIL MACHINE COMPANY, OF MISSOURI.

MACHINE FOR MAKING PUNCHES.

SPECIFICATION forming part of Letters Patent No. 628,687, dated July 11, 1899.

Application filed June 15, 1896. Serial No. 595,612. (No model.)

*To all whom it may concern:*

Be it known that I, ANDREW J. BRADLEY, a citizen of the United States, and a resident of the city of St. Louis, in the State of Missouri, have invented a new and useful Improvement in Machines for Making Punches, of which the following is a specification.

My invention relates to the manufacture of punches. Its principal object is to facilitate the process of forging a punch from a hot blank; and it consists in a finishing-die the sides of whose design are formed parallel to the axis thereof.

It also consists in a punch-forging machine provided with a forming-die and a finishing-die having the same design, formed with its sides parallel to the same axis, and means for causing said finishing-die to continue or complete the result produced by the forming-die.

It also consists in the parts and in the combination of parts hereinafter described and claimed.

In the accompanying drawings, which form a part of this specification, Figure 1 is a horizontal section of a press provided with my invention, the section being taken on the line 1 1 of Fig. 2. Fig. 2 is a central vertical section of the press on the line 2 2 of Fig. 1. Fig. 3 is a front view showing the machine in elevation, the view being taken on a plane behind the hand-wheel of the chuck. Fig. 3$^A$ is a rear view of said machine. Fig. 4 is a face view, and Fig. 5 is a cross-section, of the first forming-die, showing a draft. Fig. 6 is a face view, and Fig. 7 is a cross-section, of the second forming-die, showing the sides parallel. Figs. 8 and 9 are side views of the blank after being operated on by the first and the second dies, respectively. Figs. 10 and 11 are perspective views of the blank and the finished punch, respectively.

My invention may be utilized in divers kinds of presses; but a drop-press 1 is most suitable therefor. The ram or hammer 2 of the press is provided with a device or devices 3 adapted to hold forming-dies 4, a convenient form of such device being dovetail grooves in its under face. The two forming-dies are engraved or otherwise formed with approximately the same design, one of said dies having the design cut slightly larger in contour than is desired for the finished article and being formed with a draft or bevel, and the other die being formed with the edges of the projecting design portion parallel and with the design made of the same size as the finished article. The forming-dies being mounted on the same ram or hammer remain at a fixed distance apart. In fact, it is desirable to have the two dies cut in the same plate in order to render their relative positions permanent.

On the bed 5 of the press is a chuck 6 7, arranged to slide in suitable guides 8—such, for instance, as the dovetail grooves shown in the drawings. The chuck consists of a heavy block 6, arranged to slide in the grooves 8, and a second block 7, fitting into a chamber made therefor in the first block 6 and arranged to slide in grooves 9 in said first block 6. The upper surfaces of said blocks are flush and their meeting faces have steel bushings fitted thereto, which constitute the real jaws of the chuck and are made of a shape best suited for the blank to be operated on. These steel jaws 10 preferably project above the blocks 6 7 in order the better to protect said blocks from the impact of the hammer.

A screw-threaded collar 11 is secured to the main block 6 of the chuck by supporting-bars 12, extending laterally therefrom, and through this collar works a threaded shaft 13. The outer end of this shaft has a hand-wheel 14 thereon and the inner end has a nut or ring 15 fastened thereon to turn therewith. This ring fits in a space provided therefor between the face of the block 7 and a piece 16, mounted on said block 7, so that the block 7 is moved to and fro on the block 6, according as the shaft 13 is turned one way or the other. The effect of this movement is of course to open or close the chuck, although as the block 7 and the shaft are both mounted on the block 6 said block 6 remains stationary during such operation. For the same reason the movement of the block 6 carries with it all parts of the chuck without altering their relative positions. Such movement may be conveniently effected by a hand-lever 17, pivotally fastened to a lug 18, projecting from the middle portion of said block and pivotally fulcrumed to a link 19, pivotally secured to the frame of the press. Obviously other means for shifting the chuck may be used in place of that described.

The sliding block 6 is limited in its to-and-fro movement by adjustable stops 20. Evidently these stops may be located on the frame of the press in the path of the block; but it is preferable to mount them upon the block itself. As shown in the drawings, these stops may consist of screw-bolts 20, working in threaded hangers 21, depending from said blocks 6. Nuts 22 will set them in any position to which they may be adjusted.

The operation of the device is as follows: The forming-dies 4 are first mounted on the drop hammer or ram in as nearly perfect alinement as is practicable and parallel with the line of travel of the chuck, so that the impression made by one of said dies upon a blank held in the chuck can be centered under the other die by merely shifting the chuck. While the chuck is centered beneath each die successively, the adjustable stops 20 are turned until they strike the frame of the press and are thereby set to limit the movement of the chuck in both directions, so that in either of its extreme positions thus ascertained the chuck is accurately centered beneath one or the other of the two forming-dies. The blank 24 to be operated on is then placed while heated, preferably to a bright cherry heat, between the open jaws of the chuck. Then the hand-wheel 14 is turned to move the block 7 against the block 6, thus clamping the blank between the steel bushings. The blank shown in the drawings is an ordinary bolt without a thread and is particularly applicable to the making of stencil-character punches for stencil-machines. Its shank fits between the steel jaws and its head rests on the circular steel bushing in suitable position to receive the impact of the hammer. The hand-lever 17 is then shifted until the stop 20 strikes the frame of the press, in which position the hot bolt is directly under the first forming-die—the die shown in Fig. 4. The hammer then falls, causing the first die to impress its design pyramidally in said blank, which is left as shown in Fig. 8. The hammer is then raised, the hand-lever is shifted as far as the stop will permit, (which is directly under the finishing-die,) and the hammer is again dropped, thereby displacing the pyramidal side portions back far enough to make all the longitudinal edges of the projecting portion parallel and thus completing the formation of the face portion of the punch, which may be ejected from the press by any suitable contrivance.

As the object sought to be attained is parallelism of the sides of the design portion of the finished punch, it is obvious that the finishing-die may be formed with a slight relief or clearance, which is the reverse of the draft or taper of a forming-die and the practical equivalent of parallel sides.

What I claim is—

1. A finishing-die for forming stencil-character punches, having the sides of its design formed parallel, substantially as described.

2. A machine for forging stencil-character punches, comprising a finishing-die mounted on the hammer and having the sides of its design formed parallel, substantially as described.

3. A machine for forming stencil-character punches, comprising a hammer having a forming-die and a finishing-die of the same design, said finishing-die having the sides of its design parallel, and means for centering the work relatively to each die successively, substantially as described.

4. A machine for making punches comprising the combination of two forming-dies mounted on the hammer, one of said dies having its design formed with a draft and the other die having the same design formed with parallel sides, a chuck movably secured to the bed of the press and limiting devices for centering said chuck beneath each of said dies, substantially as and for the purpose set forth.

ANDREW J. BRADLEY.

Witnesses:
JAMES A. CARR,
CHAS. E. WISE.